B. HUSE.
MECHANICAL MOVEMENT.
APPLICATION FILED AUG. 5, 1908.

933,904.

Patented Sept. 14, 1909.

Witnesses
John H. Blakeney
John E. Wheeler

Inventor
Byron Huse by
Medina and Griffin
Attys

UNITED STATES PATENT OFFICE.

BYRON HUSE, OF PALERMO, CALIFORNIA, ASSIGNOR OF ONE-HALF TO GEORGE M. SPARKS, OF OROVILLE, CALIFORNIA.

MECHANICAL MOVEMENT.

933,904.  Specification of Letters Patent.  Patented Sept. 14, 1909.

Application filed August 5, 1908. Serial No. 447,057.

*To all whom it may concern:*

Be it known that I, BYRON HUSE, a citizen of the United States, residing at Palermo, in the county of Butte and State of California, have invented a new and useful Mechanical Movement, of which the following is a specification, in such full and clear terms as will enable those skilled in the art to construct and use the same.

This invention relates to a device which is used for the purpose of changing a rotary motion into a reciprocating motion, the object being to use the reciprocatory motion for pumping and for other purposes of this character where a long reciprocating motion is desired. It will be noted that it is quite difficult to give such a motion with a crank on account of the great strength necessary with such a construction when the stroke is very long. This objection is avoided with this construction for the reason that the pull is made almost in line with a chain during the greater portion of the stroke of the reciprocating member, the rotary motion being limited to a very small part of the total stroke by reason of the fact that the chain travels over small sprockets at each end of the stroke.

Figure 1:
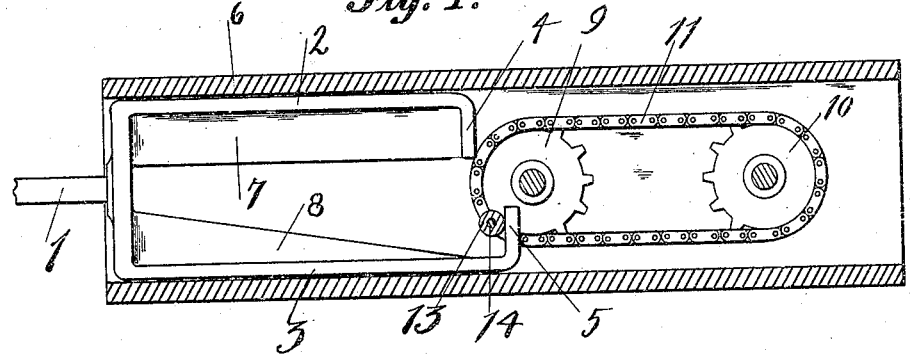
Figure 2:
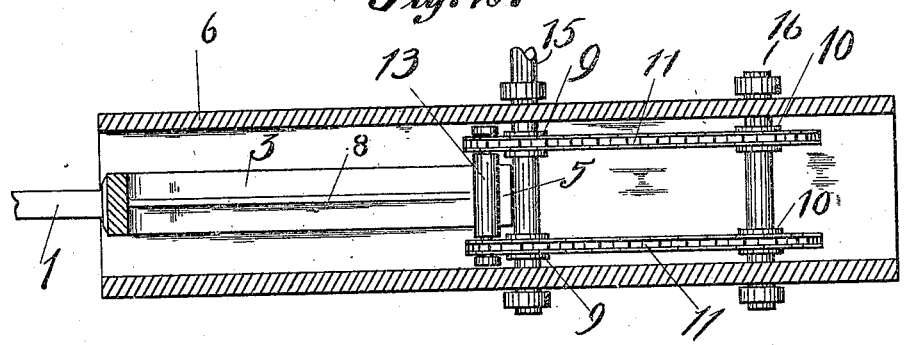
Figure 3:
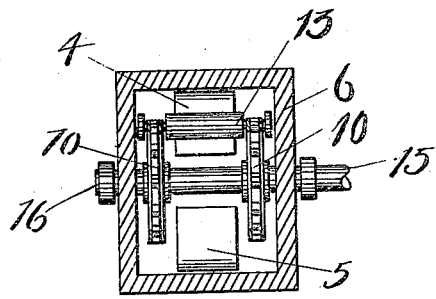

In the drawings, in which the same numeral is applied to the same portion of the device throughout, Figure 1 is a side elevation of the device, Fig. 2 is a plan view of the same, and Fig. 3 is an end elevation, the outside frame of the machine being cut away in each figure to show the interior.

The rod to be reciprocated is numbered 1 and has secured thereto the forwardly extending arms 2 and 3 which are braced by means of the ribs 7 and 8. The end of each arm is provided with a bearing portion, 4 on the upper arm and 5 on the lower arm. The two arms move back and forward in a box like frame 6 which carries the bearings for two sprocket wheel shafts 15 and 16, and passing over each of the wheels 9 and 10 is a sprocket chain 11, there being two of the chains, and connecting the two chains there is a pin 14 which carries a long roller 13.

The arms 2 and 3 have their ends 5 and 4 spaced such a distance apart as to permit the passage of the shafts when the chains move them forward, and the roller carried between the two chains reduces the friction due to the pull on the reciprocating member. The advantage of having two chains is that no other means is necessary to avoid friction on the sides of the frame, and the single roller bears on a single arm thus making the reciprocating part more easy to construct than where two parts are used.

Having thus described my invention what I claim as new and desire to secure by Letters Patent of the United States is as follows:

In a mechanical movement, a frame, a pair of shafts carried thereby, a pair of sprocket wheels carried by each shaft, a chain passing over each set of wheels, a pin connecting the chains, a pitman adapted to be reciprocated and having an arm above and an arm below the plane of the two shafts one of said arms being longer than the other, a depending finger on one of the arms and an upwardly extending finger on the other arm, said fingers having their ends spaced such a distance apart as to pass over both said shafts, and a guide for said pitman.

In testimony whereof I have set my hand this 25th day of July A. D. 1908, in the presence of the two subscribed witnesses.

BYRON HUSE.

Witnesses:
CARLETON GRAY,
W. A. WARD.